United States Patent [19]

Hashimoto

[11] 4,297,696

[45] Oct. 27, 1981

[54] COLOR UNIFORMING DRIVE IN AN ELECTROCHROMIC DISPLAY DEVICE

[75] Inventor: Sadakatsu Hashimoto, Nara, Japan

[73] Assignee: Sharp Kabushiki Kaisha, Osaka, Japan

[21] Appl. No.: 143,015

[22] Filed: Apr. 23, 1980

[30] Foreign Application Priority Data

Apr. 24, 1979 [JP] Japan ................................. 54-50968

[51] Int. Cl.³ .............................................. G06F 3/14
[52] U.S. Cl. ..................... 340/785; 340/713; 340/811; 340/805; 350/357
[58] Field of Search ............... 340/785, 783, 805, 811, 340/812, 713; 350/357

[56] References Cited

U.S. PATENT DOCUMENTS

| 3,736,043 | 5/1973 | Sambucetti | 340/785 |
| 3,987,433 | 10/1976 | Kennedy | 340/785 |
| 4,150,365 | 4/1979 | Natori | 340/785 |
| 4,160,241 | 7/1979 | Shimizu | 340/785 |
| 4,219,809 | 8/1980 | Schwarzchild et al. | 340/785 |

Primary Examiner—Marshall M. Curtis
Attorney, Agent, or Firm—Birch, Stewart, Kolasch and Birch

[57] ABSTRACT

An electrochromic display cell includes a predetermined number of display segments, different combinations of the display segments defining different desired display patterns. A drive system is provided for the electrochromic display cell, which functions to apply a coloration voltage write-in signal to a selected display segment which should be changed from the bleached state to the coloration state upon change of the display data. After completion of the write-in operation, the electrochromic display cell is held in an electrically opened state for a predetermined period of time, and then the display segments which are in the coloration state are electrically connected with each other in order to uniform the coloration degree of each of the colored display segments.

4 Claims, 11 Drawing Figures

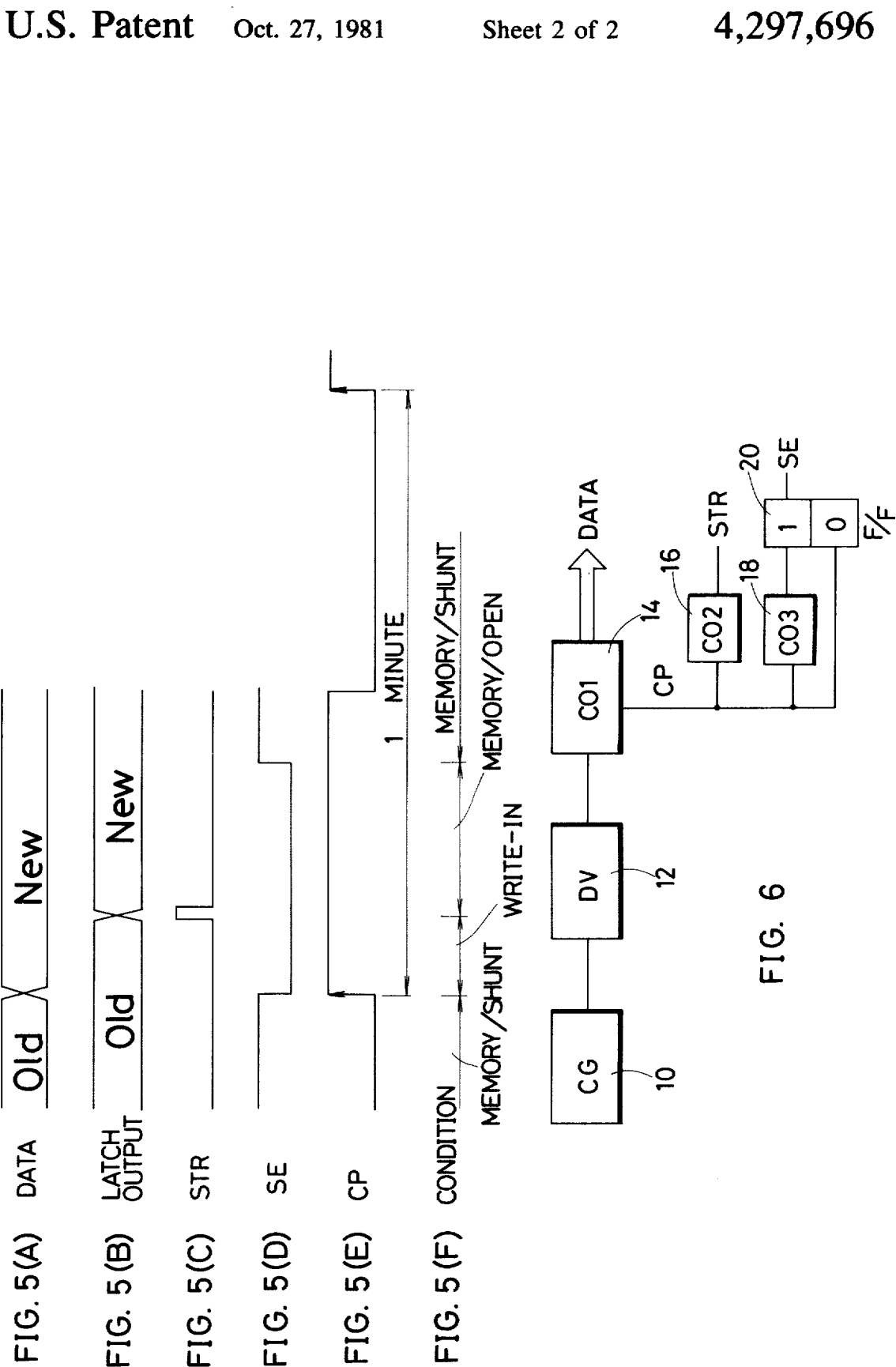

COLOR UNIFORMING DRIVE IN AN ELECTROCHROMIC DISPLAY DEVICE

BACKGROUND AND SUMMARY OF THE INVENTION

The present invention relates to a drive system for an electrochromic display device and, more particularly, to a drive system for uniforming the coloration condition in an electrochromic display device.

In an electrochromic display device of the segmented type, it is strictly required that each colored segment shows the same coloration degree to enhance the legibility. The coloration degree is determined by the charge density applied to the display segment at the coloration operation.

One method for uniforming the coloration degree of the display segments is proposed in copending application, UNIFORM COLORATION CONTROL IN AN ELECTROCHROMIC DISPLAY OF THE SEGMENTED TYPE, Ser. No. 893,513, filed on Apr. 4, 1978 by Hiroshi Hamada, Hiroshi Take, Yasuhiko Inami and Hisashi Uede, and assigned to the same assignee as the present application, wherein the colored segments are electrically connected with each other immediately after completion of the coloration operation.

The present inventor has discovered that transient current flows between the colored segments if the colored segments are electrically connected with each other immediately after completion of the coloration operation. The transient current will create differences of the coloration degree among the colored segments.

Accordingly, an object of the present invention is to provide a novel drive system for an electrochromic display device of the segmented type.

Another object of the present invention is to provide a drive system for an electrochromic display device of the segmented type, which uniforms the coloration degree of each colored segment.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, the coloration voltage signal is applied only to display segments which should be changed from the bleached state to the colored state. The remaining display segments inclusive of display segments continuously maintained in the coloration condition do not receive the coloration voltage signal. After completion of application of the coloration voltage signal, each segment is held at an electrically opened memory state for a predetermined period of time, for example, five seconds, and then the display segments placed in the coloration condition are electrically connected with each other to uniform the coloration degree.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIGS. 5(A) through 5(F) are time charts showing various signals occurring within the control circuit of FIG. 3; and FIG. 6 is a block diagram of a timepiece employing the drive system of the present invention.

DESCRIPTION OF THE PREFERRED EMBODIMENTS

Figure 1:
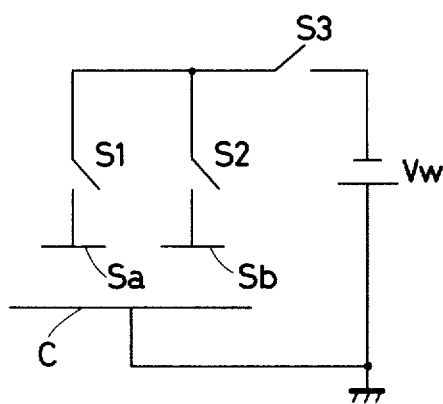
FIG. 1 is a schematic block diagram showing a basic construction of a drive system for an electrochromic display device.

FIG. 1 schematically shows a drive system of the constant voltage type for an electrochromic display device, wherein only two display segments are shown for the purpose of simplicity.

Now assume that a first display segment $S_a$ is now placed in the coloration state, and a second display segment $S_b$ is now placed in the bleached state. Under these conditions, when the second display segment $S_b$ is desired to be changed to the coloration state to change the display pattern, a coloration voltage signal is applied to the second display segment $S_b$. More specifically, a first switch $S_1$ is maintained off, and second and third switches $S_2$ and $S_3$ are switched on to connect the second display segment $S_b$ to a coloration voltage source $V_w$ for a predetermined write-in period $t_w$.

At this moment, it is required that the first display segment $S_a$ and the now colored second display segment $S_b$ show the same coloration degree to enhance the legibility. To uniform the coloration degree, one method is proposed in copending application, UNIFORM COLORATION CONTROL IN AN ELECTROCHROMIC DISPLAY OF THE SEGMENTED TYPE, Ser. No. 893,513 filed on Apr. 4, 1978, wherein the third switch $S_3$ is switched off, and the first switch $S_1$ is switched on immediately after completion of the write-in operation. That is, the first switch $S_1$ is switched on at the same time when the third switch $S_3$ is switched off in order to electrically connect the first and second display segments $S_a$ and $S_b$ with each other.

The above-mentioned method proposed in Ser. No. 893,513 is not perfectly desirable due to the following facts.

Figure 2:
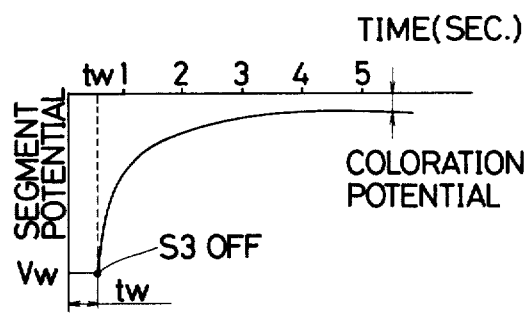
FIG. 2 is a graph showing segment potential variation of a colored segment in an electrochromic display device.

The now colored second display segment $S_b$ shows the potential variation as shown in FIG. 2 if maintained in an electrically opened state after completion of the write-in operation. More specifically, about five seconds are required before the colored display segment reaches a stable coloration condition. Accordingly, when the first switch $S_1$ is switched on while the second display segment $S_b$ is in the transient condition, an electric current flows from the first display segment $S_a$ to the second display segment $S_b$ through the switches $S_1$ and $S_2$ due to the potential difference between the first and second display segments $S_a$ and $S_b$. Therefore, the first display segment $S_a$ shows the coloration degree slightly higher than the second display segment $S_b$ even though the second display segment $S_b$ has been colored to the same coloration degree as the first display segment $S_a$.

A typical voltage level of the coloration voltage source $V_w$ is about $-1$ through $-2$ volts, and a counter electrode C and the positive terminal of the coloration voltage source $V_w$ are usually grounded. The write-in period $t_w$ is usually about 0.5 seconds. In this case, the stable coloration potential is about $-0.3$ volts, and about five seconds are required, after completion of the write-in operation, till the colored display segment reaches the stable coloration condition.

In order to prevent the above-mentioned undesirable coloration operation between the display segments $S_a$ and $S_b$, the now colored display segment $S_b$ should be held in an electrically opened state, after completion of the write-in operation, for a predetermined period of time, for example, five seconds before the display segments $S_a$ and $S_b$ are electrically connected with each other. More specifically, the first switch $S_1$ should be switched on at five second past the switching off operation of the third switch $S_3$.

Figure 3:
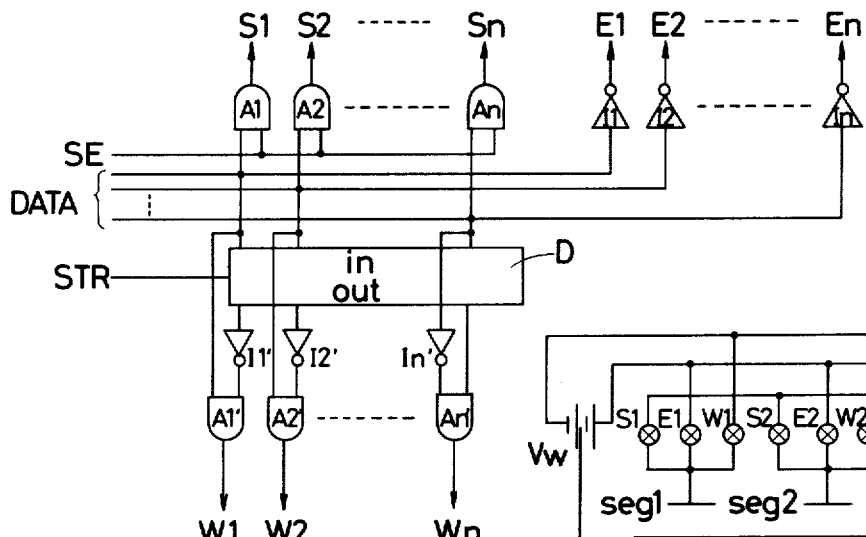
FIG. 3 is a block diagram of an embodiment of a control circuit for an electrochromic display device of the present invention.

FIG. 3 shows an embodiment of a control circuit of the present invention.

Now assume that an electrochromic display cell includes a plurality of display segments by the number n. Write-in switching control signals $W_1$ through $W_n$, bleach switching control signals $E_1$ through $E_n$, and shunt switching control signals $S_1$ through $S_n$ are developed by the number corresponding to the segment number n, respectively. The control circuit of FIG. 3 mainly comprises AND gates $A_1$ through $A_n$ and $A'_1$ through $A'_n$, inverters $I_1$ through $I_n$ and $I'_1$ through $I'_n$, and a latch circuit D including a plurality of D-type flip-flops. The latch circuit D functions to memorize the display condition of each segment and develops the write-in switching control signals $W_1$ through $W_n$ toward the display segments which should be changed from the bleached condition to the coloration condition. The bleach switching control signals $E_1$ through $E_n$ are developed in response to the display data applied to the control circuit.

When a predetermined period of time has passed from the initiation of the write-in operation, a strobe pulse STR is applied to the latch circuit D to store the new display data therein, and to complete the write-in operation. Upon completion of the write-in operation, development of the write-in switching control signals $W_1$ through $W_n$ is terminated. When a preselected period of time has passed from the completion of the write-in operation, a shunting signal SE is developed, which is commonly applied to the AND gates $A_1$ through $A_n$. Since the other input terminals of the AND gates $A_1$ through $A_n$ receive display data signals stored in the latch circuit D, the shunt switching control signals $S_1$ through $S_n$ are developed toward the display segments which are placed in the coloration condition. Accordingly, the display segments placed in the coloration condition are electrically connected with each other when a preselected time has passed after completion of the write-in operation. The shunting signal SE should be changed to the low level when the next write-in/bleach operation is started.

Figure 4:
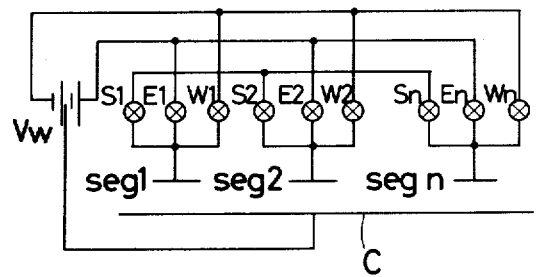
FIG. 4 is a block diagram of an embodiment of a driver circuit for an electrochromic display device of the present invention.

As discussed above, the write-in switching control signal $W_i$ is developed when the corresponding display segment is desired to be changed from the bleached condition to the coloration condition. The thus developed write-in switching control signal $W_i$ is applied to corresponding write-in switches $W_1$ through $W_n$ shown in FIG. 4. The bleach switching control signal $E_i$ is applied to corresponding bleach switches $E_1$ through $E_n$ shown in FIG. 4. The shunt switching control signal $S_i$ is applied to corresponding shunt switches $S_1$ through $S_n$ shown in FIG. 4. The switches $W_1$ through $W_n$, $E_1$ through $E_n$, and $S_1$ through $S_n$ can be made of analog switches implemented with C-MOS transistors, and connected to each display segment as shown in FIG. 4. Each switch is switched on when the corresponding switching control signal bears the high level.

FIGS. 5(A) through 5(F) are time charts for explaining operation of the control circuit of FIG. 3 and the driver circuit of FIG. 4.

FIG. 5(A) shows the change of display data which is applied to the control circuit of FIG. 3. FIG. 5(B) shows the display data stored in and derived from the latch circuit D. The display data stored in the latch circuit D is changed at the timing of the strobe pulse STR shown in FIG. 5(C). FIG. 5(D) shows the shunting signal SE which functions as a timing signal for the shunt switching control signal $S_i$. FIG. 5(E) shows a clock pulse CP for controlling the display data change. For example, the clock pulse CP is a one minute signal in the case where the electrochromic display device is used in a display unit for an electronic timepiece.

FIG. 5(F) shows the condition of the electrochromic display device. At the leading edge of the clock pulse CP, the display data applied to the control circuit is changed and the shunting signal SE is changed to bear the low level, whereby the write-in operation is initiated to a desired display segment. The write-in operation is terminated at the occurrence of the strobe pulse STR, and the colored display segments are placed in an electrically opened state at the same time. After a predetermined period of time has passed, the shunting signal SE bears the high level, whereby the colored display segments are electrically connected with each other to uniform the coloration degree.

FIG. 6 schematically shows an electronic timepiece employing the drive system of the present invention.

The electronic timepiece mainly comprises a clock generator 10 for developing a base frequency signal, a frequency divider 12 for developing a one minute signal, and a time information keeping circuit 14 for storing the current time information. The electronic timepiece further comprises a counter 16 for counting the write-in period and developing the strobe pulse STR, and another counter 18 for counting the low level period of the shunting signal SE. An output signal of the counter 18 is applied to an RS flip-flop 20 for providing the shunting signal SE.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In a drive system for driving an electrochromic display cell during a coloration period, and a bleaching period, said display cell having a memory period when said drive system is not driving said electrochromic display cell, said drive system including an external power source, said cell including an electrochromic material and a predetermined number of display segments, different combinations of said display segments defining different desired display patterns, said drive system comprising:

coloration means for conducting coloration operations by applying a coloration voltage to selected ones of said display segments during said coloration period;

holding means for maintaining colored segments in an electrically opened state for a predetermined period of time after completion of said coloration period; and communication means for electrically connecting said colored segments with each other during said memory period after completion of operation of said holding means.

2. The drive system of claim 1, wherein said external power source is disconnected from said electrochromic display cell when said communication means is enabled.

3. The drive system of claim 1 or 2, wherein said communication means comprises:

a conductive memory line attached to each of said display segments; and switching means for selectively connecting said colored segments to said conductive memory line.

4. The drive system of claim 3, wherein said holding means is enabled for about five seconds.

* * * * *